United States Patent
Tajima

(10) Patent No.: US 11,211,813 B2
(45) Date of Patent: Dec. 28, 2021

(54) BATTERY CHARGE CONTROL APPARATUS FOR VEHICLE AND METHOD OF CONTROLLING BATTERY CHARGING OF VEHICLE

(71) Applicant: SUBARU CORPORATION, Tokyo (JP)

(72) Inventor: Ryoichi Tajima, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 175 days.

(21) Appl. No.: 16/592,255

(22) Filed: Oct. 3, 2019

(65) Prior Publication Data

US 2020/0195033 A1   Jun. 18, 2020

(30) Foreign Application Priority Data

Dec. 17, 2018   (JP) .............................. JP2018-235063

(51) Int. Cl.
| | |
|---|---|
| *H02J 7/00* | (2006.01) |
| *H01M 10/44* | (2006.01) |
| *H02J 7/04* | (2006.01) |
| *H02M 3/156* | (2006.01) |
| *H02M 1/00* | (2006.01) |

(52) U.S. Cl.
CPC ......... *H02J 7/00718* (2020.01); *H01M 10/44* (2013.01); *H02J 7/007184* (2020.01); *H02J 7/045* (2013.01); *H02M 3/156* (2013.01); *H02J 2207/20* (2020.01); *H02J 2207/40* (2020.01); *H02M 1/0009* (2021.05)

(58) Field of Classification Search
USPC ......................................................... 320/137
See application file for complete search history.

(56) References Cited

U.S. PATENT DOCUMENTS

| | | | | |
|---|---|---|---|---|
| 6,590,370 B1* | 7/2003 | Leach | ................. | H01M 16/006 323/299 |
| 7,821,225 B2* | 10/2010 | Chou | ..................... | H02J 9/061 320/103 |
| 2006/0132102 A1* | 6/2006 | Harvey | ..................... | G05F 1/67 320/166 |

(Continued)

FOREIGN PATENT DOCUMENTS

JP           2015-046992 A        3/2015

*Primary Examiner* — Samuel Berhanu
(74) *Attorney, Agent, or Firm* — McDermott Will & Emery LLP

(57) ABSTRACT

A battery charge control apparatus to be installed in a vehicle includes a current regulation circuit and a controller. The vehicle is provided with a first battery, a voltage converter, a second battery, and an onboard device. The voltage converter lowers an output voltage of the first battery. The second battery is electrically charged by an output from the voltage converter and outputs a voltage lower than an output voltage of the first battery. The onboard device is operated by an output from the second battery and an output from the voltage converter. The current regulation circuit is disposed between the voltage converter and the second battery and reduces an amount of a charging current to be delivered via the voltage converter to the second battery. The controller controls the current regulation circuit on the basis of an output current from the voltage converter.

13 Claims, 3 Drawing Sheets

(56) References Cited

U.S. PATENT DOCUMENTS

| | | | |
|---|---|---|---|
| 2010/0237840 A1* | 9/2010 | Walter | H02J 7/0068 323/282 |
| 2013/0200846 A1* | 8/2013 | Ang | B60L 58/20 320/109 |
| 2014/0312849 A1* | 10/2014 | Lee | H02J 7/0068 320/134 |
| 2017/0126142 A1* | 5/2017 | Toujinbara | H02M 5/458 |
| 2017/0187200 A1* | 6/2017 | Somerville | H02J 7/00036 |
| 2017/0320396 A1* | 11/2017 | Kim | H02M 7/04 |
| 2018/0102702 A1* | 4/2018 | Ahn | H02P 29/50 |

* cited by examiner

BATTERY CHARGE CONTROL APPARATUS FOR VEHICLE AND METHOD OF CONTROLLING BATTERY CHARGING OF VEHICLE

CROSS-REFERENCE TO RELATED APPLICATIONS

The present application claims priority from Japanese Patent Application No. 2018-235063 filed on Dec. 17, 2018, the entire contents of which are hereby incorporated by reference.

BACKGROUND

The disclosure relates to a battery charge control apparatus to be installed in a vehicle provided with a first battery and a second battery that outputs a lower voltage than the first battery and to a method of controlling battery charging of the vehicle.

A typical electric vehicle (EV) or a hybrid electric vehicle (HEV) that achieves traveling using a traveling motor is provided with a high-voltage battery and a low-voltage battery. In some cases, electric power from the high-voltage battery is delivered to onboard devices and the low-voltage battery to charge the low-voltage battery.

SUMMARY

An aspect of the disclosure provides a battery charge control apparatus to be installed in a vehicle provided with a first battery, a voltage converter, a second battery, and an onboard device. The voltage converter is configured to lower an output voltage of the first battery. The second battery is configured to be electrically charged by an output from the voltage converter and to output a voltage lower than an output voltage of the first battery. The onboard device is configured to be operated by an output from the second battery and an output from the voltage converter. The battery charge control apparatus includes a current regulation circuit and a controller. The current regulation circuit is configured to be disposed between the voltage converter and the second battery and reduce an amount of a charging current to be delivered via the voltage converter to the second battery. The controller is configured to control the current regulation circuit on the basis of an output current from the voltage converter.

An aspect of the disclosure provides a method of controlling battery charging of a vehicle provided with a first battery, a voltage converter, a second battery, and an onboard device. The voltage converter is configured to lower an output voltage of the first battery. The second battery is configured to be electrically charged by an output from the voltage converter and to output a voltage lower than an output voltage of the first battery. The onboard device is configured to be operated by an output from the second battery and an output from the voltage converter. The method includes: acquiring data on the output from the voltage converter; and reducing a charging current to be delivered via the voltage converter to the second battery by controlling a current regulation circuit on a basis of the data acquired. The current regulation circuit is configured to be disposed between the voltage converter and the second battery.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

In the following, some embodiments of the technology are described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
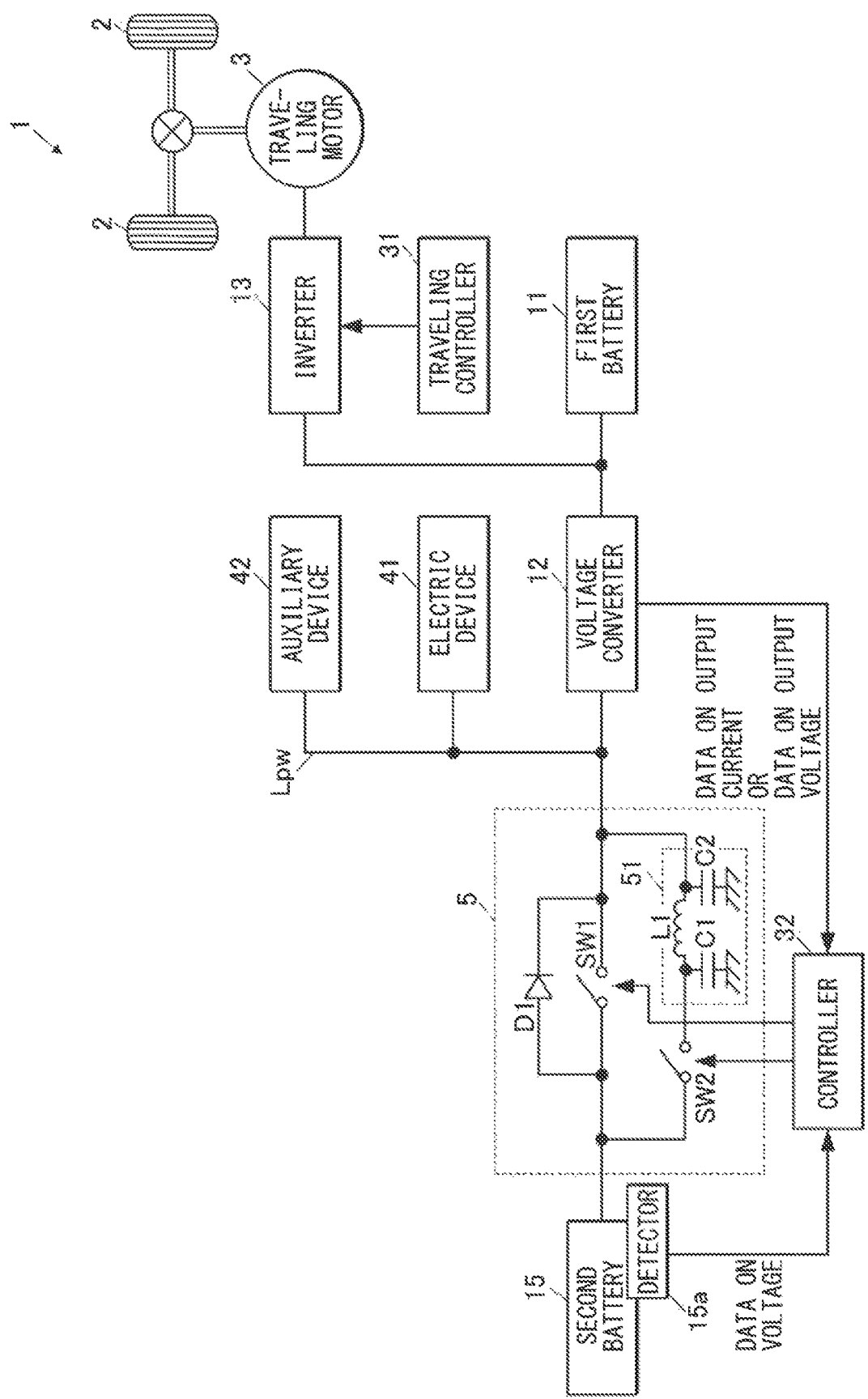
FIG. 1 is a block diagram illustrating a basic configuration of an electric system including a battery charge control apparatus to be installed on a vehicle according to one embodiment of the disclosure.

FIG. 1 is a block diagram illustrating a basic configuration of an electric system including a battery charge control apparatus installed in a vehicle 1 according to an embodiment of the disclosure.

In this embodiment, the vehicle 1 may be an electric vehicle (EV) or a hybrid electric vehicle (HEV), for example. As illustrated in FIG. 1, the vehicle 1 may be provided with drive wheels 2, an electric motor 3 that drives the drive wheels 2 for traveling (hereinafter referred to as traveling motor 3), and a first battery 11 that supplies electric power to the traveling motor 3. The first battery 11 may be a secondary battery, such as a lithium-ion battery or a nickel-metal-hydride battery, for example. The first battery 11 may hold electric power for traveling and output a high voltage for traveling.

The vehicle 1 may further include an inverter 13 and a traveling controller 31. The inverter 13 may convert electric power between the first battery 11 and the traveling motor 3. The traveling controller 31 may control the inverter 13 in accordance with a driving operation of the driver to cause power running or regenerative running of the traveling motor 3. The drive wheels 2 may be thereby driven in accordance with the driving operation, which causes the vehicle 1 to travel.

The vehicle 1 may further include an auxiliary device 42, an electric device 41, and a second battery 15. The auxiliary device 42 may be electrically driven upon driving of an unillustrated internal combustion engine, for example. The electric device 41 may be various types of devices electrically driven. The second battery 15 may supply a power voltage to the auxiliary device 42 and the electric device 41. Optionally, the auxiliary device 42 may include a starter motor that activates the internal combustion engine. Non-limiting examples of the electric device 41 may include a vehicle light, an interior light, a meter, an audio device, a display, and other various electric devices. The second battery 15 may be a secondary battery, such as a lead storage battery. The second battery 15 outputs a lower voltage (e.g., 12V) than the first battery 11. The second battery 15 may be provided with a detector 15a that detects a physical quantity, such as an open-end voltage or a discharge voltage, of the second battery 15. The physical quantity may be used for estimating the state of charge (SOC) of the second battery 15. In one embodiment of the disclosure, the electric device 41 and the auxiliary device 42 may serve as an "onboard device".

The vehicle 1 may further include a voltage converter 12. The voltage converter 12 lowers a voltage output from the first battery 11. The voltage converter 12 may output the lowered voltage to a power line Lpw coupled to the auxiliary device 42 and the electric device 41. The voltage converter 12 may be a DC/DC converter that lowers a direct-current voltage in accordance with an operation of semiconductor switches. The voltage converter 12 may lower a high voltage output from the first battery 11 to a lower voltage that is within a range of a voltage to be supplied from/to the second battery 15. The voltage converter 12 may detect an output current while lowering the high voltage of the first battery 11, and may output data on the output current. Alternatively, the voltage converter 12 may detect an output voltage in place of the output current, and may output data on the output voltage.

The vehicle 1 may further include a current regulation circuit 5 and a controller 32 that controls the current regulation circuit 5. The current regulation circuit 5 may reduce or regulate a charging current to be delivered via the power line Lpw to the second battery 15. The controller 32 may receive the data on the detection value of the second battery 15 from the detector 15a. As described above, the detection value may be the data on the physical quantity, such as an open-end voltage or a discharge voltage, of the second battery. The physical quantity may be used for estimating the state of charge (SOC) of the second battery 15. Additionally, the controller 32 may receive data on the output current from the voltage converter 12. In one embodiment of the disclosure, a combination of the controller 32 and the current regulation circuit 5 may serve as a "battery charge control apparatus".

The current regulation circuit 5 may include a first switch SW1, a smoothing filter 51, a second switch SW2, and a power diode D1. The first switch SW1 may couple the power line Lpw to the second battery 15 and uncouple the power line Lpw from the second batter 15. The second switch SW2 may couple the power line Lpw to the second battery 15 via the smoothing filter 51 and uncouple the power line Lpw from the second battery 15 via the smoothing filter 51. The power diode D1 may transfer a driving current from the second battery 15 to the power line LPw. The smoothing filter 51 may smooth an electric current flowing therein in accordance with the switching operation of the second switch SW2. The smoothing filter 51 may include, for example but not limited to, an inductor L1 provided between an input end and an output end of the smoothing filter 51, an electrostatic capacitor C1 provided between the input end and the ground potential, and an electrostatic capacitor C2 provided between the output end and the ground potential. The smoothing filter 51 may be coupled in series to the second switch SW2. The series circuit including the smoothing filter 51 and the second switch SW2, the first switch SW1, and the power diode D1 may be coupled in parallel to each other between the power line Lpw and an output end of the second battery 15.

The power diode D1 may supply a driving current to the electric device 41 and the auxiliary device 42. The power diode D1 may thus be different from a parasitic diode of the semiconductor switch. Optionally, the power diode D1 may have a maximum momentary rating that temporarily supplies a large electric current to the electric device 41 and the auxiliary device 42 when required.

The first switch SW1 and the second switch SW2 may be power semiconductor switches, for example. The second switch SW2 may be controlled to perform a switching operation in which turning-on and turning-off are repeated relatively rapidly. The rapid switching operation may not be performed in the first switch SW1. The switch SW1 may be switched between ON and OFF. Alternatively, the first switch SW1 may be a relay.

When the SOC of the second battery 15 is low, the first switch SW1 may be turned on and the second switch SW2 may be turned off in the current regulation circuit 5 having the configuration described above. This may cause a charging current to flow from the voltage converter 12 to the second battery 15 to charge the second battery 15. As the SOC of the second battery 15 decreases, the voltage of the second battery 15 may decrease. When an output voltage of the second battery 15 becomes lower than an output voltage of the voltage converter 12, a charging current may be delivered from the voltage converter 12 to the second battery 15 via the first switch SW1.

When the SOC of the second battery 15 is high, the first switch SW1 may be turned on and the second switch SW2 may be turned off in the current regulation circuit 5. This may cause a driving current to be supplied from the second battery 15 to the auxiliary device 42 and the electric device 41 via the first switch SW1. As the SOC of the second battery 15 increases, the voltage of the second battery 15 may increase. When an output voltage of the second battery 15 becomes equal to or higher than an output voltage of the voltage converter 12, a driving current may be delivered from the second battery 15 and the voltage converter 12 to the auxiliary device 42 and the electric device 41 in accordance with a change in load.

Additionally, when the SOC of the second battery 15 is low, the first switch SW1 may be turned off and the second switch SW2 may be caused to perform the switching operation in the current regulation circuit 5. This may cause a charging current to flow from the voltage converter 12 to the second battery 15 via the second switch SW2. The charging current flowing via the second switch SW2 to the second battery 15 may be reduced or regulated compared with the charging current flowing via the first switch SW1 to the second battery 15. The second switch SW2 may be alternately switched between ON and OFF under a switching control, such as a pulse width modulation (PWM) control. The charging current may be thereby delivered from the voltage converter 12 via the smoothing filter 51 to the second battery 15. The magnitude of the charging current to be delivered from the voltage converter 12 to the second battery 15 may be increased or decreased by controlling the on-duty of the second switch SW2. The term "on-duty" used herein refers to the duty ratio or duty cycle of an on-period of the second switch SW2, and is hereinafter simply referred to as "on-duty".

Further, when a load on the auxiliary device 42 or the electric device 41 temporarily increases while the first switch SW1 is turned off and the second switch SW2 is turned off or under the PWM control, an electric current may be delivered from the second battery 15 via the power diode D1 in the current regulation circuit 5 to the power line LPw. Such a temporal increase in load on the auxiliary device 42 or the electric device 41 can occur at activation of the starter motor, for example. When a large electric current is temporarily drawn into the auxiliary device 42 or the electric device 41, the voltage of the power line LPw becomes lower. When the voltage of the power line LPw becomes lower than the voltage of the second battery 15 by a predetermined amount or greater, a relatively large electric current may be delivered from the second battery 15 via the power diode D1 to the power line LPw. This may serve as a complement to the driving current for the auxiliary device 42 and the electric device 41.

The controller 32 may include a storage holding a control program and control data therein. The controller 32 may execute the control program to achieve a predetermined control process. Alternatively, the controller 32 may include one or more of various electronic control units (ECU) in the vehicle 1. Still alternatively, the controller 32 may include a dedicated ECU that controls the current regulation circuit 5.

For the vehicle 1 including the first battery 11 that supplies electric power to the traveling motor 3 and the voltage converter 12 that lowers the output voltage of the first battery, there may be a demand to reduce the rated output of the voltage converter 12 to a lower level. As the rated output decreases, the voltage converter 12 may be smaller. This may advantageously lead to a reduction in mounting space for the voltage converter 12 or an increase in mounting space for other components, and in turn, a reduction in weight and cost of the voltage converter 12.

Figure 2:
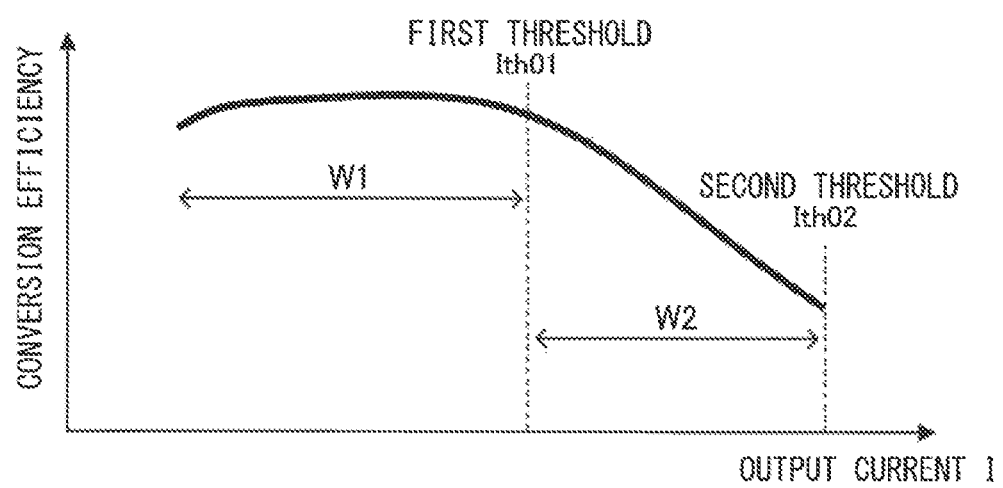
FIG. 2 is a graph illustrating a relation between an output current from a voltage converter and conversion efficiency of the voltage converter according to one embodiment of the disclosure.

FIG. 2 is a graph illustrating a relation between the output current from the voltage converter 12 and conversion efficiency of the voltage converter 12. The rated output of the voltage converter 12 may be regulated in advance to a relatively small level so as not to become excessively large with respect to the load on the electric device 41 and the auxiliary device 42. As illustrated in FIG. 2, when the output current I from the voltage converter 12 is within a proper range W1, the voltage converter 12 may exhibit high efficiency in converting electric power. In contrast, within a high load range W2 in which the output current I from the voltage converter 12 is greater than the output current I in the proper range W1, the efficiency in converting electric power may decrease with an increase in the output current.

Only regulating the rated output of the voltage converter 12 can hinder the voltage converter 12 from outputting a normal voltage upon an increase in a load on the onboard devices 41 and 42 during charging of the second battery 15, for example. Further, a small rated output of the voltage converter 12 can decrease the conversion efficiency of the voltage converter 12 upon an application of a high load, which lowers the fuel or electric consumption efficiency. In an embodiment of the disclosure that addresses such concerns, the rated output of the voltage converter 12 may be reduced while an abnormal decrease in power voltage of the onboard devices 41 and 42 or a reduction in fuel or electric consumption efficiency of the vehicle are suppressed.

[Charge Control Process]

Figure 3:
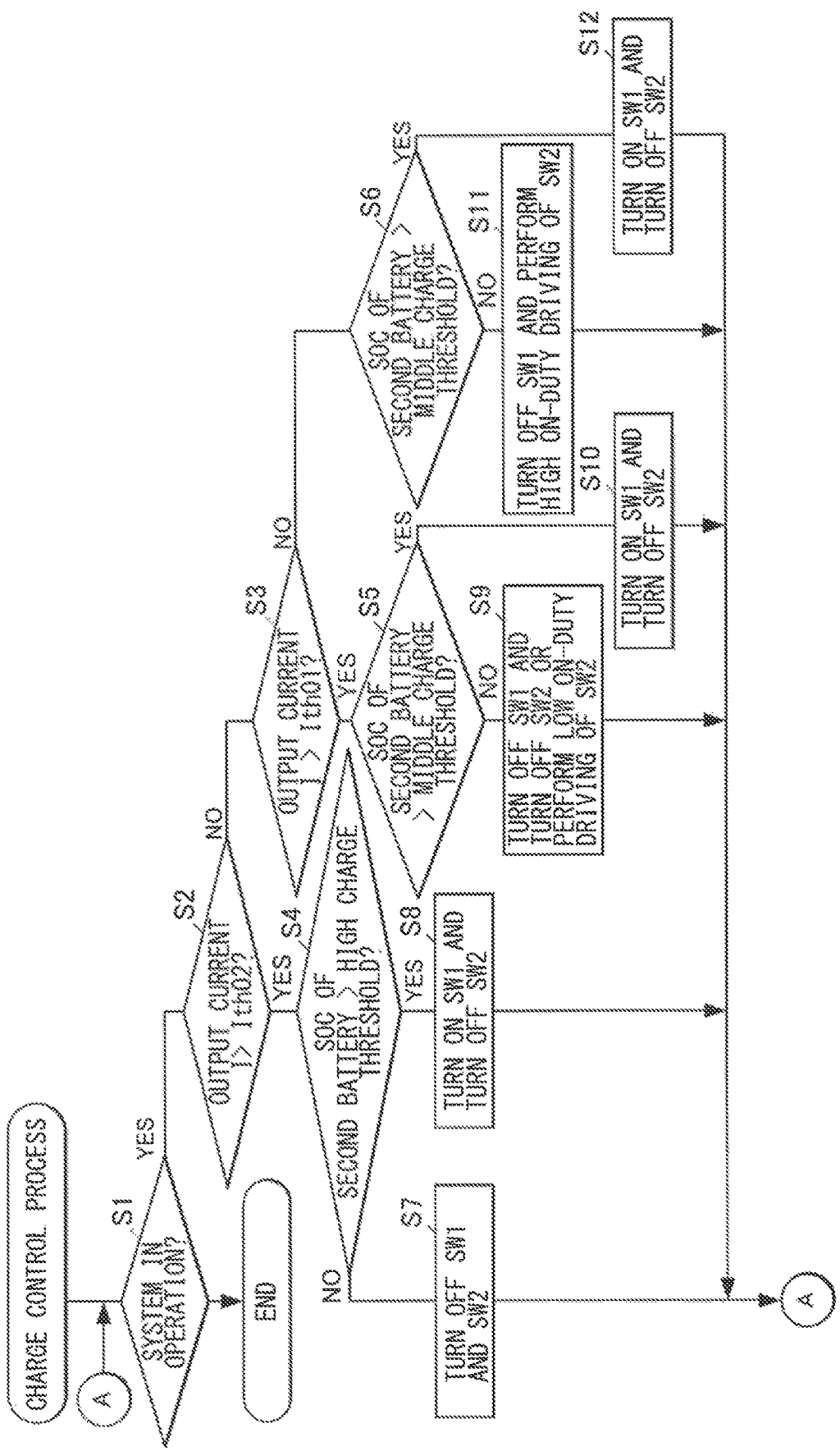
FIG. 3 is a flowchart of a charge control process executed by a controller in the battery charge control apparatus according to one embodiment of the disclosure.

FIG. 3 is a flowchart illustrating a charge control process executed by the controller 32 in the battery charge control apparatus according to an embodiment of the disclosure.

The controller 32 may start the charge control process illustrated in FIG. 3 upon application of electric power, for example. In the charge control process, the controller 32 may determine whether the electric system is in operation (Step S1). When the electric system is in operation (Step S1: YES), a loop process subsequent to Step S1 may be repeatedly executed. The wording "the electric system is in operation" used herein may refer to a state where an unillustrated main relay is coupled to an output electric path of the first battery 11 so that an output voltage of the first battery 11 is supplied to the voltage converter 12 and the inverter 13, and that electric power is supplied to the electric device 41 or the auxiliary device 42, for example.

In the loop process, the controller 32 may determine whether the output current I from the voltage converter 12 is greater than a second threshold Ith02 (Step S2). When the output current I is not greater than the second threshold Ith02 (Step S2: NO), the process may proceed to Step S3 in which whether the output current I from the voltage converter 12 is greater than a first threshold Ith01 is determined. As illustrated in FIG. 2, the first threshold Ith01 may be set in advance to a predetermined value at or around the boundary between the proper range W1 and the high load range W2 of the voltage converter 12. The second threshold Ith02 may be set in advance to a predetermined value approximate to the rated value of the voltage converter 12, for example. The second threshold Ith02 may be greater than the first threshold Ith01.

Additionally, the controller 32 may determine whether the SOC of the second battery 15 is greater than a high charge threshold in Step S4, and whether the SOC of the second battery 15 is greater than a middle charge threshold in Steps S5 and S6 in the loop process. The controller 32 may determine the SOC of the second battery 15 through conversion or calculation of an output from the detector 15a of the second battery 15. Alternatively, the controller 32 may regard the output from the detector 15a as a converted value indicative of the SOC of the second battery 15, and may compare the converted value with either a high charge threshold or a middle charge threshold, whichever corresponds to the conversion.

The high charge threshold may be set in advance to a predetermined charging rate approximate to, for example, a fully charged state where no load is applied thereon. For example, the high charge threshold may be set in advance to a charging rate at which substantially no charging current or a significantly small charging current is delivered from the voltage converter 12 to the second battery 15. The middle charge threshold may be set in advance to a charging rate at which a small charging current is delivered from the voltage converter 12 to the second battery 15 with no other load being applied thereon. In one embodiment of the disclosure, the middle charge threshold may serve as a "first threshold" for the charging rate, and the high charge threshold may serve as a "second threshold" for charging rate.

When the output current I is greater than the second threshold Ith02 (Step S2: YES) and when the SOC of the second battery 15 is not greater than the high charge threshold (Step S4: NO), the controller 32 may turn off the first switch SW1 and the second switch SW2 in Step S7. The output current I greater than the second threshold Ith02 may be approximate to the rated output of the voltage converter 12. If a charging current is output from the voltage converter 12 to the second battery 15 in such a condition, the output voltage of the voltage converter 12 can decrease to an abnormally low level. Further, if the first switch SW1 is turned on when the SOC of the second battery 15 is not greater than the high charge threshold, the charging current can be drawn by the second battery 15. In an embodiment of the disclosure that addresses such concerns, the controller 32 may turn off the first switch SW1 and the second switch SW2 in Step S7 to prevent the charging current from being drawn from the power line LPw to the second battery 15. There can be a case here the auxiliary device 42 or the electric device 41 temporarily requires a large electric current while the first switch SW1 and the second switch SW2 are turned off. In such a case, a current supply only from the voltage converter 12 is insufficient in meeting the required electric current. In an embodiment of the disclosure that addresses such a concern, an electric current may be delivered from the second battery 15 via the power diode D1 in the current regulation circuit 5 to the load. The electric current supplied from the second battery 15 to the load suppresses or prevents the voltage of the power line LPw from decreasing to an abnormally low level when a large electric current is required.

When the output current I is greater than the second threshold Ith02 (Step S2: YES) and when the SOC of the second battery 15 is greater than the high charge threshold (Step S4: YES), the controller 32 may turn on the first switch SW1 and turn off the second switch SW2 in Step S8. The second battery 15 having a high SOC may barely draw a charging current from the voltage converter 12 even when the output current I is greater than the second threshold Ith02 and approximate to the rated output. Additionally, the second battery 15 having a high SOC may supply a driving current to the electric device 41 and the auxiliary device 42. Accordingly, the switching by the controller 32 in Step S8 may allow the large load coupled with the power line LPw to be supplied with electric currents from both the second battery 15 and the voltage converter 12. The current supply from the second battery 15 via the first switch SW1 to the load may be achieved at a low loss.

When the output current I is not greater than the second threshold Ith02 (Step S2: NO) and is greater than the first threshold Ith01 (Step S3: YES) (i.e., when the output current I is in the high load range W2 illustrated in FIG. 2) and when the SOC of the second battery 15 is not greater than the middle charging rate (Step S5: NO), the controller 32 may turn off the first switch SW1 in Step S9. Additionally, the controller 32 may turn off the second switch SW2 or perform a switching control of the second switch SW2 in a low on-duty (i.e., perform low on-duty driving of the second switch SW2) in Step S9. As the output current I increases in the high load range W2, the efficiency in converting electric power can decrease, as illustrated in FIG. 2. Additionally, it is advantageous to prevent the low SOC of the second battery 15 from further decreasing. In the embodiment of the disclosure that addresses such concerns, the controller 32 may perform the switching in Step S9 to suppress or prevent the conversion efficiency of the voltage converter 12 and the SOC of the second battery 15 from decreasing.

Optionally, the on-duty of the switching control of the second switch SW2 that is executed by the controller 32 in Step 9 may be decreased as the output current I or the SOC of the second battery 15 increases.

When the output current I is not greater than the second threshold Ith02 (Step S2: NO) and is greater than the first threshold Ith01 (Step S3: YES) (i.e., when the output current I is in the high load range W2 illustrated in FIG. 2) and when the SOC of the second battery 15 is greater than the middle charging rate (Step S5: YES), the controller 32 may turn on the first switch SW1 and turn off the second switch SW2 in Step S10. It is advantageous to prevent the output current I within the high load range W2 from increasing so as not to decrease the conversion efficiency. In such a case where the voltage of the power line LPw is relatively low due to the high load and the SOC of the second battery 15 is not low, a charging current is unlikely to be drawn from the power line LPw to the second battery 15. However, a driving current is likely to be delivered from the second battery 15 to the load. In the embodiment of the disclosure that addresses such concerns, the controller 32 may perform the switching in Step S10 to suppress or prevent the conversion efficiency of the voltage converter 12 from decreasing. The switching control of the second switch SW2 described above, which consumes electric power, may not be performed in Step S10. The switching in Step S10 contributes to an improvement in the fuel or electric consumption efficiency of the vehicle 1.

When the output current I is not greater than the first threshold Ith01 (Step S3: NO) (i.e., when the output current I is in the proper range W1 illustrated in FIG. 2), and when the SOC of the second battery 15 is not greater than the middle charge threshold (Step S6: NO), the controller 32 may turn off the first switch SW1 in Step S11. Additionally, the controller 32 may perform the switching control of the second switch SW2 in a high on-duty (i.e., perform high on-duty driving of the second switch SW2) in Step S11. As the output current I is in the proper range W1, the voltage converter 12 can output high voltage to spare. Additionally, it is advantageous to increase the low SOC of the second battery 15. In the embodiment of the disclosure that addresses such concerns, the controller 32 may perform the switching in Step S11 to rapidly increase the SOC of the second battery 15 using the spare voltage of the voltage converter 12.

Optionally, the on-duty of the switching control of the second switch SW2 that is executed by the controller 32 in Step S11 may be increased as the output current I or the SOC of the second battery 15 decreases.

When the output current I is not greater than the first threshold Ith01 (Step S3: NO) (i.e., when the output current I is in the proper range W1 illustrated in FIG. 2), and when the SOC of the second battery 15 is greater than the middle charge threshold (Step S6: YES), the controller 32 may turn on the first switch SW1 and turn off the second switch SW2 in Step S12. In such a condition, the output from the voltage converter 12 and the SOC of the second battery 15 may have capacity to spare. Considering such a condition, the controller 32 may perform the switching in Step S12 to efficiently supply a driving current to the electric device 41 and the auxiliary device 42 in the embodiment of the disclosure. This makes it possible to deal with a temporal requirement for a large electric current from the electric device 41 or the auxiliary device 42. The current supply via the first switch SW1 that is turned on may be achieved at a lower loss than the current supply via the power diode D1. The switching control of the second switch SW2 described above, which consumes electric power, may not be performed in Step S12. The switching in Step S12 contributes to an improvement in efficiency in delivering electric power to the electric device 41 and the auxiliary device 42.

After any one of Steps S7 to S12, the process by the controller 32 may return to Step S1, and the loop process subsequent to Step S1 may be repeated. Thereafter, the charge control process may end when the power of the vehicle 1 is turned off to terminate the electric system.

According to the vehicle 1 and the battery charge control apparatus including the current regulation circuit 5 and the controller 32 in at least one of the foregoing embodiments of the disclosure, the current regulation circuit 5 may reduce or regulate the charging current to be delivered from the voltage converter 12 to the second battery 15. Additionally, the controller 32 may control the current regulation circuit 5 on the basis of the output current from the voltage converter 12. The controller 32 may thereby increase or decrease a charging current to be delivered to the second battery 15 in accordance with a change in the electric consumption at the electric device 41 or the auxiliary device 42. This allows the total output current from the voltage converter 12 to be regulated. Even when the voltage converter 12 having a relatively low rated output is provided, the voltage converter 12 may be operated at a proper operation point in accordance with the rated output at a high rate or high frequency. This suppresses or prevent inconveniences, such as a reduction in the voltage of the power line LPw to an abnormally low level or a significant reduction in the conversion efficiency of the voltage converter 12, from occurring. Additionally, the use of the voltage converter 12 having a low rated output leads to a reduction in the mounting space, weight, and cost of the voltage converter 12.

According to the vehicle 1 and the battery charge control apparatus in at least one of the foregoing embodiments of the disclosure, the current regulation circuit 5 may include the first switch SW1, the smoothing filter 51, the second switch SW2, and the power diode D1. The first switch SW1 may be turned on to deliver electric power between the second battery 15 and the power line LPw at low loss. The second switch SW2 may be subjected to the switching control to reduce or regulate the electric current to be delivered from the voltage converter 12 to the second battery 15 for charging the second battery. Furthermore, the first switch SW1 may be turned off to regulate the charging of the second battery 15. When a large electric current is temporarily required by the electric device 41 or the auxiliary device 42 during the regulation of the charging of the second battery 15, an electric current may be delivered from the second battery 15 via the power diode D1 to the power line LPw to complement part of the large current. In other words, the current regulation circuit 5 makes it possible to achieve a current control appropriate for various circumstances where the SOC of the second battery 15 and the magnitude of the output current I of the voltage converter 12 are different from each other.

According to the vehicle 1 and the battery charge control apparatus in at least one of the foregoing embodiments of the disclosure, the controller 32 may change a reduction (regulation) amount of a charging current to be delivered via the current regulation circuit 5 to the second battery 15 on the basis of the result of comparison between the output current I and the first threshold Ith01, as illustrated in Steps S3, S9, and S11 in FIG. 3. Accordingly, it is possible to charge the second battery 15 while suppressing the conversion efficiency of the voltage converter 12 from decreasing.

According to the vehicle 1 and the battery charge control apparatus in at least one of the foregoing embodiments of the disclosure, the controller 32 may change a reduction (regulation) amount of a charging current to be delivered via the current regulation circuit 5 to the second battery 15 on the basis of the SOC of the second battery 15, as illustrated in Steps S5, S9, and S10, or Steps S6, S11, and S12 in FIG. 3). Accordingly, it is possible to achieve a charging control of the second battery 15 in consideration of both the conversion efficiency of the voltage converter 12 and the SOC of the second battery 15.

According to the vehicle 1 and the battery charge control apparatus in at least one of the foregoing embodiments of the disclosure, the controller 32 may control the current regulation circuit 5 on the basis of the result of the comparison between the output current I and the second threshold Ith02 to switch the second battery 15 between being charged and not being charged (refer to YES and NO in Step S2 in FIG. 3). Such a control allows for the use of the voltage converter 12 having a relatively small rated output. Even when the output from the voltage converter 12 becomes close to the rated output, a charging current may be prevented from flowing from the voltage converter 12 to the second battery 15. This suppresses or prevents a decrease in the output voltage of the voltage converter 12 to an abnormally low level.

Although some of the embodiments of the disclosure are described above, the scope of the disclosure should not be limited thereto.

For example, in at least one of the foregoing embodiments, the controller 32 may control the current regulation circuit 5 on the basis of the output current I from the voltage converter 12. The output current I from the voltage converter 12, however, has a correlation with the total amount of an electric current supplied to the electric device 41 and the auxiliary device 42 (i.e., a load current), an output voltage of the voltage converter 12, and the driving conditions of the electric device 41 and the auxiliary device 42 (i.e., the driving condition of the load). Accordingly, in an alternative embodiment of the disclosure, the controller 32 may control the current regulation circuit 5 in a similar way on the basis of one or more of the load current, the output voltage of the voltage converter 12, and the driving condition of the load, in place of or in addition to the output current I. In the alternative embodiment, the first threshold Ith01 and the second threshold Ith02 for the output current I described in the foregoing embodiments may be changed to values or conditions in accordance with the parameters for controlling the current regulation circuit 5.

Additionally, in the foregoing embodiments of the disclosure, the configuration in which a charging current to the second battery 15 may be reduced by the switching operation of the second switch SW2 is described with reference to the example illustrated in FIG. 1. However, the circuit configuration of the smoothing filter 51, the way of connection between the second switch SW2 and the smoothing filter 51, and other configurations may be changed as appropriate. Details of the configuration in the foregoing embodiments may be modified as appropriate without departing from the scope of the disclosure.

Accordingly, it is possible for the foregoing embodiments of the disclosure to reduce the rated output of the voltage converter while suppressing or preventing inconveniences, such as a decrease in the output voltage of the voltage converter to an abnormally low level due to an excessive load with respect to the rated output of the voltage converter, and a decrease in the fuel or electric consumption of the vehicle due to driving of the voltage converter in an inefficient operation range, from occurring.

Although some example configurations, example processing, and modification examples according to an embodiment of the technology are described hereinabove, the foregoing embodiments are mere examples and are not intended to limit the scope of the technology. It should be also appreciated that various omissions, replacements, and modifications may be made in the foregoing embodiments described herein, without departing from the scope of the spirit of the technology. The technology is intended to include such modifications and alterations in so far as they fall within the scope of the appended claims or the equivalents thereof.

The invention claimed is:

1. A battery charge control apparatus to be installed in a vehicle provided with a first battery, a voltage converter, a second battery, and an onboard device, the voltage converter being configured to lower an output voltage of the first battery, the second battery being configured to be electrically charged by an output from the voltage converter and to output a voltage lower than an output voltage of the first battery, the onboard device being configured to be operated by an output from the second battery and an output from the voltage converter, the battery charge control apparatus comprising:
- a current regulation circuit configured to be disposed between the voltage converter and the second battery and reduce an amount of a charging current to be delivered via the voltage converter to the second battery; and
- a controller configured to control the current regulation circuit on a basis of an output current from the voltage converter, wherein the current regulation circuit includes:
- a first switch configured to couple a power line to the second battery and uncouple the power line from the second battery, the power line being configured to transfer electric power from the voltage converter to the onboard device;
- a smoothing filter;
- a second switch configured to couple the second battery to the power line via the smoothing filter and uncouple the second battery from the power line via the smoothing filter; and
- a power diode configured to transfer a driving current from the second battery to the power line, the driving current being configured to drive the onboard device.

2. The battery charge control apparatus according to claim 1,
wherein the smoothing filter provided between the power line and the second battery and coupled in parallel to the first switch.

3. The battery charge control apparatus according to claim 1, wherein the controller is configured to change the amount of the charging current to be reduced by controlling the current regulation circuit on a basis of a result of a comparison between the output current from the voltage converter and a first threshold.

4. The battery charge control apparatus according to claim 2, wherein the controller is configured to change the amount of the charging current to be reduced by controlling the current regulation circuit on a basis of a result of a comparison between the output current from the voltage converter and a first threshold.

5. The battery charge control apparatus according to claim 3, wherein the controller is configured to change the amount of the charging current to be reduced by controlling the current regulation circuit on a basis of a state of charge of the second battery in addition to the result of the comparison between the output current from the voltage converter and the first threshold.

6. The battery charge control apparatus according to claim 4, wherein the controller is configured to change the amount of the charging current to be reduced by controlling the current regulation circuit on a basis of a state of charge of the second battery in addition to the result of the comparison between the output current from the voltage converter and the first threshold.

7. The battery charge control apparatus according to claim 1, wherein the controller is configured to switch the second battery between being charged and not being charged by controlling the current regulation circuit on a basis of a result of a comparison between the output current from the voltage converter and a second threshold.

8. The battery charge control apparatus according to claim 2, wherein the controller is configured to switch the second battery between being charged and not being charged by controlling the current regulation circuit on a basis of a result of a comparison between the output current from the voltage converter and a second threshold.

9. The battery charge control apparatus according to claim 1, wherein the controller is configured to control the current regulation circuit on a basis of one or more of an output voltage of the voltage converter, a driving current to be delivered to the onboard device, and a driving state of the onboard device, in place of or in addition to the output current from the voltage converter.

10. The battery charge control apparatus according to claim 2, wherein the controller is configured to control the current regulation circuit on a basis of one or more of an output voltage of the voltage converter, the driving current to be delivered to the onboard device, and a driving state of the onboard device, in place of or in addition to the output current from the voltage converter.

11. The battery charge control apparatus according to claim 1, wherein
the vehicle is further provided with an electric motor for traveling, the electric motor serving as a driving source of the vehicle, and
the first battery is configured to supply electric power to the electric motor.

12. The battery charge control apparatus according to claim 2, wherein
the vehicle is further provided with an electric motor for traveling, the electric motor serving as a driving source of the vehicle, and
the first battery is configured to supply electric power to the electric motor.

13. A method of controlling battery charging of a vehicle provided with a first battery, a voltage converter, a second battery, and an onboard device,
the voltage converter being configured to lower an output voltage of the first battery;
the second battery being configured to be electrically charged by an output from the voltage converter and to output a voltage lower than an output voltage of the first battery,
the onboard device being configured to be operated by an output from the second battery and an output from the voltage converter,
the method comprising:
acquiring data on the output from the voltage converter; and
reducing a charging current to be delivered via the voltage converter to the second battery by controlling a current regulation circuit on a basis of the data acquired,
the current regulation circuit being configured to be disposed between the voltage converter and the second battery,
wherein the vehicle is further provided with:
a first switch configured to couple a power line to the second battery and uncouple the power line from the second battery, the power line being configured to transfer electric power from the voltage converter to the onboard device;
a smoothing filter;

a second switch configured to couple the second battery to the power line via the smoothing filter and uncouple the second battery from the power line via the smoothing filter; and a power diode configured to transfer a driving current from the second battery to the power line, the driving current being configured to drive the onboard device.

* * * * *